(12) United States Patent
Kawamata et al.

(10) Patent No.: US 7,847,678 B2
(45) Date of Patent: Dec. 7, 2010

(54) VEHICLE SURROUNDINGS INFORMATION OUTPUT SYSTEM AND METHOD FOR OUTPUTTING VEHICLE SURROUNDINGS INFORMATION

(75) Inventors: Shinya Kawamata, Gotenba (JP); Yasuo Hagisato, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 636 days.

(21) Appl. No.: 11/814,371

(22) PCT Filed: Sep. 25, 2006

(86) PCT No.: PCT/IB2006/002641
§ 371 (c)(1),
(2), (4) Date: Jul. 20, 2007

(87) PCT Pub. No.: WO2007/034314
PCT Pub. Date: Mar. 29, 2007

(65) Prior Publication Data
US 2008/0204208 A1    Aug. 28, 2008

(30) Foreign Application Priority Data
Sep. 26, 2005  (JP)  ............................. 2005-278550

(51) Int. Cl.
*B60Q 1/00* (2006.01)
(52) U.S. Cl. .................................... 340/435; 340/425.5
(58) Field of Classification Search ............... 340/425.5
See application file for complete search history.

(56) References Cited

U.S. PATENT DOCUMENTS 6,445,809 B1   9/2002  Sasaki et al.
6,744,380 B2   6/2004  Imanishi et al.

(Continued)

FOREIGN PATENT DOCUMENTS

DE    295 18 301 U1    6/1996

(Continued)

OTHER PUBLICATIONS

E. Binelli, et al., "A Modular Tracking System for Far Infrared Pedestrian Recognition", Intelligent Vehicles Sympsium 2005, Proceedings. IEEE. XP 010833888, pp. 758-763, 2005.

(Continued)

*Primary Examiner*—Benjamin C Lee
*Assistant Examiner*—Cal Eustaquio
(74) *Attorney, Agent, or Firm*—Oblon, Spivak, McClelland, Maier & Neustadt, L.L.P.

(57) ABSTRACT

A vehicle surroundings information output system includes a vehicle surroundings information obtaining mechanism obtaining information about the vehicle surroundings, an object detector detecting an object around the vehicle based on the obtained vehicle surroundings information, an outputting mechanism outputting information relating to the detected object, a detection reliability determining mechanism determining the detected detection reliability of the detected object, and a notifying information generator generating notifying information that relates to that object according to the detection reliability. The notifying information generator is structured to generate notify information that does not easily stimulate at least one of the five senses of a driver when the detection reliability of the object is low as compared to when that detection reliability is high.

11 Claims, 8 Drawing Sheets

U.S. PATENT DOCUMENTS

| | | | |
|---|---|---|---|
| 6,819,261 B2 | 11/2004 | Nishiwaki et al. | |
| 2002/0191837 A1* | 12/2002 | Takeda et al. | 382/154 |
| 2003/0214393 A1* | 11/2003 | Nishiwaki et al. | 340/435 |
| 2005/0134479 A1* | 6/2005 | Isaji et al. | 340/901 |
| 2006/0055525 A1* | 3/2006 | Kubota et al. | 340/461 |

FOREIGN PATENT DOCUMENTS

| | | |
|---|---|---|
| DE | 102 53 510 | 5/2004 |
| DE | 103 60 137 A1 | 7/2005 |
| EP | 1 223 083 | 7/2002 |
| JP | 7 61257 | 3/1995 |
| JP | 8 304560 | 11/1996 |
| JP | 2000-74645 | 3/2000 |
| JP | 2000 251200 | 9/2000 |
| JP | 2001 357498 | 12/2001 |
| JP | 3300340 | 4/2002 |
| JP | 2003 291688 | 10/2003 |
| JP | 2003-317197 | 11/2003 |
| JP | 2003-337996 | 11/2003 |
| JP | 2004 30212 | 1/2004 |
| JP | 2005-135037 | 5/2005 |
| WO | WO 2005/063525 A1 | 7/2005 |

OTHER PUBLICATIONS

Y. Fang, et al., "A New Night Visionary Pedestrian Detection and Warning Systems", MTL Annual Report 2002, Microsystems Technology Laboratories, XP 002410864, 2006, Internet.

Yajun Fang, et al., "A Shape-Independent Method for Pedestrian Detection With Far-Infrared Images" IEEE Transactions on Vehicular Technology, vol. 53, No. 6, XP 011122458, 2004.

Urban Meis, et al., "Detection and Classification of Obstacles in Night Vision Traffic Scenes Based on Infrared Imagery", Intelligent Transportation Systems, 2003, Proceedings, IEEE, vol. 2, XP 010673223, pp. 1140-1144, 2003.

Thomas Buecher, et al., "Image Processing and Behavior Planning for Intelligent Vehicles", IEEE Transactions on Industrial Electronics, vol. 50, No. 1, XP 011073800, pp. 62-75, 2003.

* cited by examiner

VEHICLE SURROUNDINGS INFORMATION OUTPUT SYSTEM AND METHOD FOR OUTPUTTING VEHICLE SURROUNDINGS INFORMATION

FIELD OF THE INVENTION

The invention relates to a vehicle surroundings information output system that informs a driver of the existence of an object about which the driver should be warned, such as an object or person around the vehicle, and a method for outputting vehicle surroundings information.

BACKGROUND OF THE INVENTION

Vehicles are used both in conditions with good visibility, such as during the day, and in conditions with poor visibility, such as at night or in bad weather. Thus, in conditions where the visibility is good, the driver can see people and objects such as fallen objects around the vehicle by looking at the actual landscape with his or her (hereinafter, the driver will be referred to in the masculine form for simplicity) own eyes. In conditions where the visibility is poor, however, it is difficult for the driver to see all of these by looking the landscape. Hence, vehicle surroundings information output systems have been developed which inform the driver of the existence an object about which the driver is to be warned (hereinafter also referred to simply as "object"), such as a person or object around the vehicle.

Japanese Patent Application Publication No. JP-A-2003-291688, for example, describes one kind of vehicle surroundings information output system which is a so-called head-up display (HUD) that displays the landscape in front of the vehicle on the front windshield as both an object about which the driver is to be warned and a virtual image.

When an object is detected in front of the vehicle, the vehicle surroundings information output system (i.e., the head-up display system) described in Japanese Patent Application Publication No, JP-A-2003-291688 displays information (a solid star symbol) of strong visual stimulus to the driver and moves information (a triangular outline) to guide the driver's line of sight from that place to the object on the head-up display. That is, after an object is detected, the vehicle surroundings information output system described in Japanese Patent Application Publication No. JP-A-2003-291688 notifies the driver of the existence of that object by displaying information that stimulates the driver's vision (i.e., catches the driver's eye) and draws his line of sight to it (i.e., by displaying highly visually alluring information).

Also, other similar vehicle surroundings information output systems (head up display systems) which display such highly visually alluring information are described below.

Japanese Patent Application Publication No. JP-A-7-61257 describes a vehicle surroundings information output system which displays highly visually alluring information when the driver is not looking at the display of the head-up display and displays not so visually alluring information when the driver is looking at the display from the head-up display.

Japanese Patent Application Publication Nos. JP-A-2004-30212 and JP-A-2001-357498 describe vehicle surroundings information output systems which suppress the provision of information relating to a detected object as necessary. More specifically, Japanese Patent Application Publication No. JP-A-2004-30212 describes a vehicle surroundings information output system which prevents the driver from receiving more information than is necessary, thereby reducing the burden on the driver, by providing the minimum necessary information relating to objects while suppressing the provision of highly visible and visually alluring information relating to objects. Meanwhile, Japanese Patent Application Publication No. JP-A-2001-357498 describes a vehicle surroundings information output system which prevents the driver from receiving more information than is necessary, thereby reducing the burden on the driver, by suppressing information relating to objects near where the driver is looking.

Incidentally, Japanese Patent Application Publication No. JP-A-2000-251200 discloses an obstacle detection system structured such that warnings are issued more often when visibility of detected objects is poor than when it is good.

However, the vehicle surroundings information output system described in Japanese Patent Application Publication No. JP-A-2003-291688 provides the driver with high visually alluring information instantaneously after an object has been detected. That is, the head-up display displays highly visually alluring information when it is still unclear as to whether that object is real or not. Therefore, even if that object does not actually exist, the driver's eyes are still drawn to that highly visually alluring information. When the driver wants to drive by detecting objects on the actual landscape with his own eyes, his line of sight is forced from the actual landscape by the false information. The same can also be said for the vehicle surroundings information output system described in Japanese Patent Application Publication No. IP-A-7-61257 when highly visually alluring information is displayed when the driver is not looking at the head-up display.

In this case, even though these kinds of problems exist, if no information is provided to the driver until it is clear as to whether the object is real or not and that object happens to really exist, and further, if a warning has to be issued quickly, the notification to the driver of that object ends up being delayed. The same may also be said for the vehicle surroundings information output systems described in Japanese Patent Application Publication Nos. JP-A-2004-30212 and JP-A-2001-357498 when the provision of information regarding a detected object is suppressed as necessary because the driver feels it is annoying.

That is, despite the fact that some drivers want to drive giving priority to information obtained from the actual landscape while other drivers want to drive giving priority to information provided by the vehicle surroundings information output systems described above, these systems provide and suppress information relating to objects with disregard to the intentions of both kinds of drivers.

DISCLOSURE OF THE INVENTION

In view of the problems of the foregoing vehicle surroundings information output systems, this invention thus provides a vehicle surroundings information output system capable of providing information, when an object is detected, relating to that object in a form that matches the intention of the driver, as well as a method for displaying vehicle surroundings information.

A first aspect of the invention relates to a vehicle surroundings information output system that includes vehicle surroundings information obtaining means for obtaining information about the vehicle surroundings, object detecting means for detecting an object around the vehicle based on the vehicle surroundings information obtained from the vehicle surroundings information obtaining means, and outputting means for outputting information relating to the object detected by the object detecting means. This vehicle surroundings information output system is provided with detection reliability determining means for determining the detection reliability of the object detected by the object detecting means, and notifying information generating means for generating notifying information that relates to the object according to the detection reliability determined by the detection reliability determining means. The notifying information generating means generates notifying information that does not easily stimulate at least one of the five senses of a driver when the detection reliability of the detected object is low as compared to when that detection reliability is high.

With the vehicle surroundings information output system according to this first aspect, when the detection reliability of the detected object is low (i.e., when it is unclear whether that object is real), a driver who is driving while relying on the notifying information provided by the system will easily notice the notifying information, while a driver who is driving while giving priority to information from the actual landscape obtained by his own eyes over the notifying information provided by the system will not easily notice that notifying information. Therefore, a driver who is relying on the notifying information provided by the system can be instantaneously made aware of the existence of the object, which is preferably from the viewpoint of safety. On the other hand, a driver who wants to drive giving priority to information from the actual landscape obtained through his own eyes rather than the notifying information provided by the system can continue to look at the landscape without being distracted by an object that may or may not be real, thereby improving safety.

Here, the detection reliability determining means may determine the detection reliability based on the time for which the object continues to be detected or the number of times that the object continues to be detected.

Also, the notifying information generated by the notifying information generating means may be displayed by the outputting means to stimulate the visual sense of the driver.

Further, the notifying information generating means may generate notifying information that is displayed blinking by the outputting means according to the level of the detection reliability of the object.

With the vehicle surroundings information output system having the structure described above, when the detection reliability of the detected object is high (i.e., when it is clear that the object actually exists), it is easier for not only the driver that is relying on the notifying information provided by the system, but also the driver that is giving more priority to information from the actual landscape seen through his own eyes than to the notifying information provided by the system, to notice the blinking notifying information. Therefore, both drivers can be made aware of an object that actually exists, and thereby drive while paying attention to that object.

The notifying information generating means may generate notifying information which changes the luminance of the object displayed by the outputting means according to the level of the detection reliability of the object.

The outputting means may also emit a sound, and the notifying information generated by the notifying information generating means may be the sound emitted by the outputting means and aimed at the auditory sense of the driver.

The notifying information generating means may continue to generate the notifying information until the object is no longer detected.

The notifying information generating means may continue to generate the notifying information for a predetermined period of time.

A second aspect of the invention relates to a vehicle surroundings information output system that includes vehicle surroundings information obtaining means for obtaining information about the vehicle surroundings, object detecting means for detecting an object around the vehicle based on the vehicle surroundings information obtained from the vehicle surroundings information obtaining means, and outputting means for outputting information relating to the object detected by the object detecting means. This vehicle surroundings information output system is provided with detection reliability determining means for determining the detection reliability of the object detected by the object detecting means, and notifying information generating means for generating notifying information that relates to the object according to the detection reliability determined by the detection reliability determining means. The notifying information generating means generates notifying information that stimulates at least one of the five senses of a driver more strongly, as the detection reliability of the object is higher.

A third aspect of the invention relates to a method for outputting vehicle surroundings information. This method includes the steps of obtaining information about the vehicle surroundings, detecting information relating to an object around the vehicle for the driver based on the obtained vehicle surroundings information, outputting the detected information relating to the object, determining the reliability of the detected information relating to the object, and generating notifying information that is related to the object according to the determined reliability, and generating notifying information that does not easily stimulate at least one of the five senses of a driver when that reliability is low as compared to when that reliability is high.

A fourth aspect of the invention relates to a method for outputting vehicle surroundings information. This method includes the steps of obtaining information about the vehicle surroundings, detecting information relating to an object around the vehicle based on the obtained vehicle surroundings information, outputting the detected information relating to the object, determining the reliability of the detected information relating to the object, and generating notifying information that is related to the object according to the determined reliability, and generating notifying information that increasingly stimulates at least one of the five senses of a driver the higher that reliability.

The vehicle surroundings information output system of the invention makes it possible to provide information relating to an object which takes the intentions of the driver, such as wanting to rely on the notifying information provided by the system or wanting to rely on information of the actual landscape obtained through the driver's own eyes, when an object is detected. As a result, the vehicle surroundings information output system of the invention not only improves safety while driving, but also eliminates needless annoyance to the driver.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Hereinafter, example embodiments of the vehicle surroundings information display system according to the present invention will be described in detail with reference to the accompanying drawings. It is to be understood, however, that the invention is not limited to these example embodiments.

A vehicle surroundings information display system according to a first example embodiment of the invention will now be described with reference to FIGS. 1 to 8.

First, the structure of the vehicle surroundings information display system according to the first example embodiment will be described with reference to FIG. 1.

The vehicle surroundings information display system according to the first example embodiment includes vehicle surroundings information obtaining means 10 for obtaining information about the vehicle surroundings, controlling means (i.e., an ECU) 20 for receiving the vehicle surroundings information obtained by the vehicle surroundings information obtaining means 10 and executing various steps described below based on that vehicle surroundings information, and displaying means (i.e., outputting means) 30 for displaying (outputting) the results of the steps executed by the controlling means 20.

Figure 1:
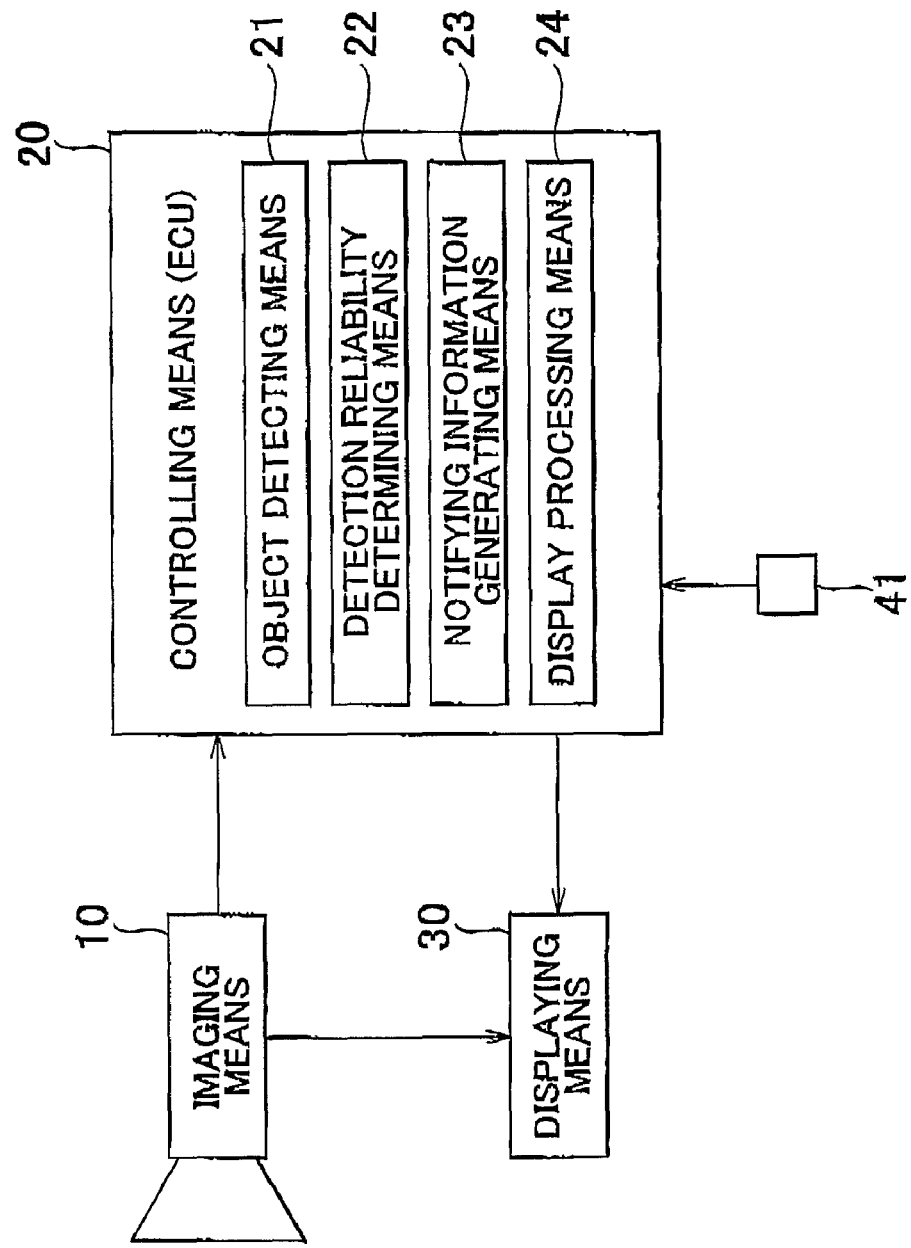
FIG. 1 is a block diagram showing the structure of a vehicle surroundings information display system according to a first example embodiment of the invention.

As shown in FIG. 1, the controlling means 20 of the vehicle surroundings information display system according to the first example embodiment includes object detecting means 21, detection reliability determining means 22, notifying information generating means 23, and display processing means 24, each of which functions as a process or step of the controlling means 20. The object detecting means 21 detects an object about which a driver should be warned, such as an object or person around the vehicle, based on the vehicle surroundings information received from the vehicle surroundings information obtaining means 10. The detection reliability determining means 22 determines the detection reliability of the object that was detected by the object detecting means 21. The notifying information generating means 23 generates information for notifying the driver of the existence of the detected object (hereinafter this information will be referred to as "notifying information"). The display processing means 24 displays information and the like relating to the object with displaying means 30. Here in the first example embodiment, the notifying information generated by the notifying information generating means 23 is visual information, as will be described later, though this is only an example. Therefore, in the first example embodiment, the display processing means 24 also displays the notifying information with the displaying means 30.

Hereinafter, a specific example of the vehicle surroundings information display system according to the first example embodiment will be described in detail. For example, here, imaging means such as an infrared camera or the like that captures an image of the vehicle surroundings is used as the vehicle surroundings information obtaining means 10. In this example, the vehicle surroundings information display system notifies the driver of an object around the vehicle based on that captured image. More specifically, the vehicle surroundings information obtaining means 10 is an infrared camera which is imaging means provided at a front portion (such as near the rearview mirror in the vehicle cabin or in an open portion of the bumper) of the vehicle. In this example, the vehicle surroundings information display system alerts the driver to an object such an object or person in front of the vehicle while driving at night or in poor weather, for example, based on the image captured by the imaging means. In this vehicle surroundings information display system, the vehicle surroundings information obtaining means 10 will be referred to simply as "imaging means 10". The following description will be based on this imaging means 10.

The object detecting means 21 of the controlling means 20 in this vehicle surroundings information display system is structured to detect an object in front of the vehicle based on a signal received from the imaging means 10 such as an NTSC image signal or the like. The object can be detected by a method known in the field of the invention.

For example, an infrared camera is used here as the imaging means 10. As a result, the object detecting means 21 can detect animals and people as the object from heat source distribution information received from the imaging means 10. Meanwhile, the object detecting means 21 can process the image captured by the imaging means 10 and determine whether the object is an object about which the driver should be warned by determining the positional relationship between the host vehicle and the object in the captured image. For example, the object detecting means 21 identifies the position of the object and the road shape in front of the vehicle from that captured image. If the object is on the road on which the host vehicle is traveling, the system detects that object as an object about which the driver should be warned.

Here, the object on the road in front of the host vehicle way also be a fallen object, another vehicle or the like that is stopped, or another vehicle running in front of the host vehicle. Therefore, the object detecting means 21 calculates the relative speed of the host vehicle with respect to the object based on vehicle speed information from a vehicle speed sensor 41 that is detected successively and information regarding movement in the position of the object from image signals from the imaging means 10 received successively. It is then determined whether that object is an object about which the driver should be warned by comparing this relative speed and the vehicle speed of the host vehicle. Incidentally, a fallen object or another vehicle which is stopped that is on the road on which the host vehicle is traveling can of course be an object about which the driver should be warned. In the case of another vehicle traveling in front of the host vehicle, however, the other vehicle may or may not be recognized as an object depending on the relative vehicle speed.

The object detecting means 21 may also be structured to take into account the vehicle speed information obtained from the vehicle speed sensor 41 and information regarding the distance between the host vehicle and the person or object or the like that may become an object about which the driver should be warned in the captured image, and detect that person or object or the like if the relationship between the distance and the vehicle speed is within a predetermined range. For example, the object detecting means 21 may also be structured to consider the person or object that may become an object as an object about which the driver should be warned if the distance to that person or object or the like is farther than a predetermined distance with respect to the current vehicle speed, and consider that person or object as an object about which the driver should be warned if that distance is within a predetermined distance with respect to the current vehicle speed.

Continuing on, the detection reliability determining means 22 of the controlling means 20 in this vehicle surroundings information display system will now be described in detail. This detection reliability determining means 22 is structured to determine the detection reliability of an object detected by the object detecting means 21.

The detection reliability of the object in this case refers to the detection accuracy of an object that is detected by the object detecting means 21, i.e., the degree indicating whether that detected object is real or not. That is, it is difficult to determine whether an object is real or not when it is detected only once so a value is used for making that determination. When the detected object is really in front of the vehicle, the detection reliability indicates a high value and when the object is not really in front of the vehicle (as may be the case when an object is falsely detected due to noise or a dirty lens or the like, for example), the detection reliability indicates a low value.

For example, the foregoing object detecting means 21 continuously determines whether there is an object from image signals successively received from the imaging means 10. If there is an actual object in front of the vehicle, a detection signal related to that object (i.e., an object detection signal) will continue to be detected. If, on the other hand, an object that was detected at a given point is not actually in front of the vehicle, the object detecting means 21 will stop detecting the detection signal related to the same object (i.e., the object detection signal) from the image signal received after the time of that detection. Also, if the object is falsely detected due to a dirty lens as described above, for example, the detection signal related to that object (i.e., the object detection signal) will also be included in the image signal after the time of that detection. In the case of a false detection, however, the relative speed between the host vehicle and the object will remain "0" at all of those detection times so the object detecting means 21 will no longer detect it as an object.

That is, if the object detecting means 21 continues to detect the same object for a predetermined period of time or longer, the reliability of the detection results of the detected object increases. If, on the other hand, the object detecting means 21 does not continue to detect the same object for a predetermined period of time or longer, the reliability of the detection results for the detected object decreases.

Therefore, the detection reliability determining means 22 according to the first example embodiment determines that the detection reliability is high when the same object continues to be detected for a predetermined period of time t1 or longer. If the same object does not continue to be detected for the predetermined period of time t1 or longer, on the other hand, the detection reliability determining means 22 determines that the detection reliability is low.

Continuing on, the notifying information generating means 23 of the controlling means 20 in the vehicle surroundings information display system will now be described in detail This notifying information generating means 23 is structured to generate notifying information that notifies the driver of the existence of a detected object.

This notifying information is typically information that can stimulate the five senses of the driver. In the vehicle surroundings information display system according to the first example embodiment as well, the notifying information generating means 23 is structured to generate this kind of notifying information that can stimulate the five senses.

More specifically, the notifying information generating means 23 according to the first example embodiment generates visual information as the notifying information. In this example, this visual information is displayed, together with an image captured by the imaging means 10 which includes an image of the object, on a combiner 32 of the displaying means 30, to be described later, by the display processing means 24. More specifically, in this first example embodiment, a frame that surrounds the detected object (hereinafter referred to as "object frame") is generated by the notifying information generating means 23. The display processing means 24 then displays this object frame on the combiner 32 as notifying information. As a result, the object frame is visually stimulating to the driver so the driver's eyes can be guided to that object frame. That is, the object frame is used as notifying information that is visually stimulating to the driver and catches his eye (i.e., it is visually alluring).

Here, it is difficult to determine the realness of the object detected in the capture image by only the initial image of that object as described above. It is therefore undesirable to display highly visible notifying information that will reliably guide the driver's eyes to an object when it is unclear whether that object is real or not. That is, a driver of a vehicle provided with the vehicle surroundings information display system may prioritize driving while carefully looking at the actual landscape in front of him and detecting an object in front of the vehicle with his own eyes, using the information displayed on the combiner 32 as supplementary information. If notifying information that is highly visible (i.e., visibly alluring) which tends to guide the driver's line of sight to the combiner 32 is displayed, the driver in this case may end up paying more attention to that information than to the actual landscape. Unless the realness of the object related to that notifying information is clear, however, there is also a possibility that the displayed object may not really exist, as described above. Accordingly, it would be better that the driver not avert his attention from the actual landscape to the image of the combiner 32 for an object that may not even exist (i.e., an object for which realness has not yet determined).

On the other hand, in conditions where the visibility is poor, for example, the driver may also wish to drive relying more on the information displayed on the combiner 32 than making decisions by himself by looking at the actual landscape. In this case, if notifying information is not displayed simply because the realness of the object is unclear, it is difficult for the driver to ascertain the object from the image on the combiner 32. If that object were real, it may be difficult for the driver to realize that it is there. More specifically, in this case, no matter how much the driver relies on the information of the combiner 32, most drivers will look at the image of the combiner 32 for only moments at a time over many glances while driving looking at the landscape rather than pay continuous attention to the image of the combiner 32. Therefore, it is difficult to momentarily ascertain an object from an image with no notifying information when the driver's line of sight is moving in this way. Accordingly, in order to see that an object really exists from the image on the combiner 32, the driver must pay close attention to that image. More particularly, in conditions where al object is not easily visible from the actual landscape, the driver must fix his gaze on the image of the combiner 32 and search for the object. Further, for a driver relying on information obtained from the image of the combiner 32, even if the object is not real as described above, it is still more preferable from the viewpoint of safety to display the notifying information than for the driver not to be notified at all.

Therefore, the notifying information generating means 23 according to the first example embodiment is structured to generate notifying information that does not easily stimulate the five senses (in this case, the visual sense) of the driver until it is at least clear whether the detected object is real Or not (i.e., when the detection reliability determining means 22 has determined that the detection reliability of the object is low). More specifically, the notifying information generating means 23 in this example embodiment is structured to generate notifying information with which it is easier to recognize the existence of the object with a driver who is driving while giving priority to information obtained from the image of the combiner 32, and more difficult to recognize the existence of the object with a driver who is driving while giving priority to information obtained by his own eyes over information obtained from the image. More specifically, the notifying information generating means 23 is structured to generate notifying information that is more noticeable by the driver when the driver is looking carefully at the image and generates notifying information that is less noticeable by the driver when the driver is not looking carefully at the image. For example, such notifying information may the object frame described above that surrounds that object, but of reduced luminance.

Here, one image signal includes one object though the invention is not necessarily limited to one, i.e., a plurality of objects may be detected from a signal image signal. Therefore, the object frame which serves as the notifying information according to the first example embodiment may in this case be of the same low luminance for all of the objects. Further, the luminance of each object may also be changed as long as the following two conditions are satisfied: 1) the object is more noticeable to the driver when the driver is looking carefully at the image on the combiner 32 described above, and 2) the object is less noticeable when the driver is not looking carefully at that image. In the case of the latter, for example, the luminance may be made different for a person or animal or the like than it is for another vehicle or building or the like in front of the host vehicle.

Meanwhile, when the realness of the detected object has become clear (i.e., when the detection reliability determining means 22 has determined that the detection reliability of the object is either high or low), then whether or not that object actually exists becomes clear. If that object actually exists, it is necessary to alert the driver to that object, regardless of whether he is looking at the image or at the actual environment. Here, when the driver is driving while relying on information displayed on the combiner 32 described above, the driver can be made aware of the existence of the object with the actual notifying information, i.e., with the notifying information indicated as the low luminance object frame. When the driver is using the information from the combiner 32 described above as supplementary information, however, the object frame is difficult to notice, unless he shifts his line of sight to the image of the combiner 32 at least once. As a result, the driver may not readily notice the existence of the object with the actual notifying information.

Therefore, the notifying information generating means 23 according to the first example embodiment is structured to generate notifying information that is highly visually alluring to alert the driver to the existence of an object when the detection reliability determining means 22 has determined that the detection reliability of that object is high. For example, the notifying information generating means 23 may generate at this time the notifying information that is displayed blinking or with high luminosity on the image of the combiner 32.

In the first example embodiment, notifying information is generated which, for example, is displayed blinking. For example, the control means 20 according to the first example embodiment is structured to make the notifying information generating means 23 generate a frame (hereinafter referred to as "HUD frame") that follows the outer peripheral portion of the combiner 32, and the display processing means 24 is provided to make that HUD) frame blink.

Incidentally in the first example embodiment, the low luminance frame described above that surrounds that object is already displayed on the combiner 32 when it is determined that the detection reliability of the object is high. Accordingly, the display processing means 24 may also be structured to make that low luminance frame blink as the notifying information.

Next, the displaying means 30 of the vehicle surroundings information display system will be described in detail.

The displaying means 30 may be, for example, a monitor (such as a monitor of a car navigation system) mounted in the vehicle cabin or a so-called head-up display system that projects an image onto the front windshield. In this first example embodiment, a case will be described in which the latter, i.e., a head-up display system, is used as the displaying means 30.

Figure 2:
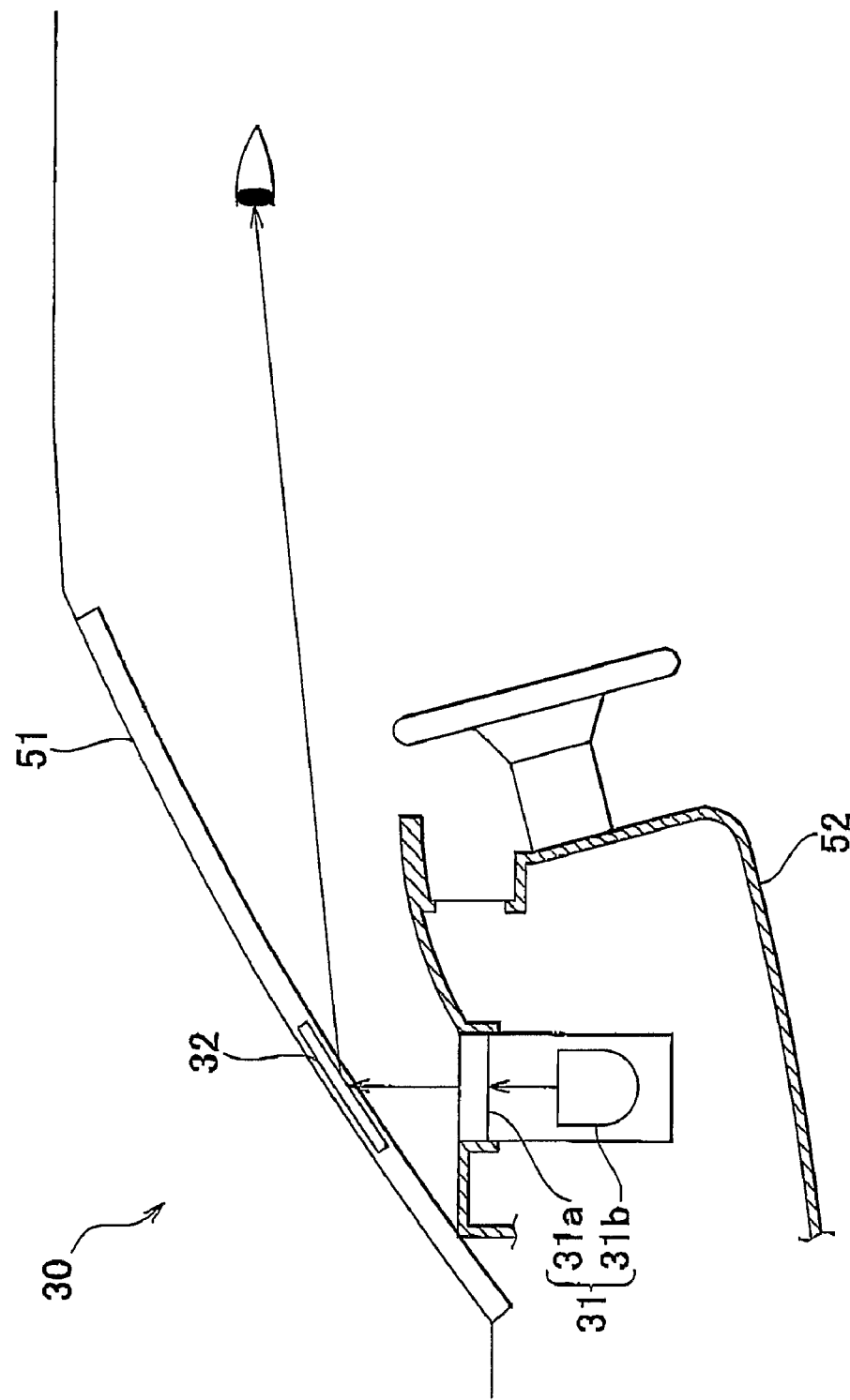
FIG. 2 is a view showing the structure of displaying means of the vehicle surroundings information display system according to the first example embodiment.

The displaying means (i.e., the head-up display system) 30 of the first example embodiment has a structure that is well known in the field of the invention. For example, as shown in FIG. 2, the display means 30 may include a head-up display unit (hereinafter simply referred to as "HUD unit") 31 which receives the image signal from the imaging means 10 as described above, and a combiner 32 that forms an image projected from the HUD unit 31.

The HUD unit 31 includes an indicator 31a that displays the captured image related to the image signal received from the imaging means 10 and notifying information generated by the notifying information generating means 23 of the controlling means 20, and a light source 31b that projects the display content displayed by the indicator 31a onto the combiner 32. The HUD unit 31 is arranged inside of an instrument panel 52 that extends from the lower edge side of a front windshield 51 shown in FIG. 2 toward the inside of the vehicle cabin.

In this HUD unit 31, light from the light source 31b that functions as back light is let in from the back surface of the indicator 31a which is formed of a liquid crystal panel, for example. The outgoing light related to the display content of the indicator 31a is projected onto the combiner 32 provided on the front windshield 51.

Here, the combiner 32 is formed of a functioning member, such as a holographic optical element in which the reflective angle changes depending on the wavelength, and is set to reflect a wavelength component relating to the display content of the outgoing light that reaches it toward the eyes of the driver. Accordingly, the outgoing light relating to the display content is focused in front of the driver so that the display content of the indicator 31a, i.e., the captured image from the imaging means 10 and the virtual image corresponding to the notifying information are displayed in front of the driver.

Figure 7:
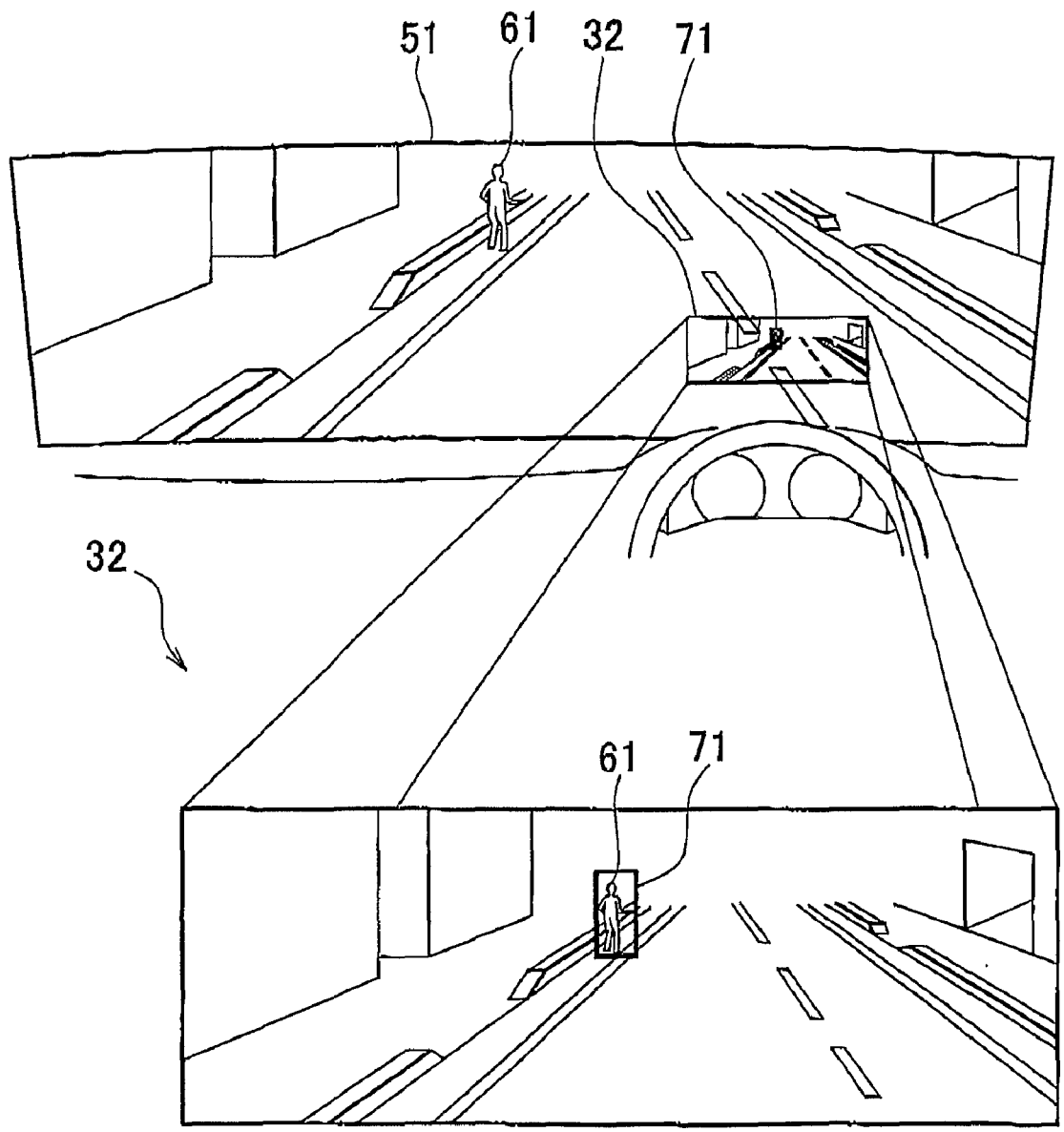
FIG. 7 is a view showing an object frame in a head-up display that is shown when the object in FIG. 6 is detected.
Figure 8:
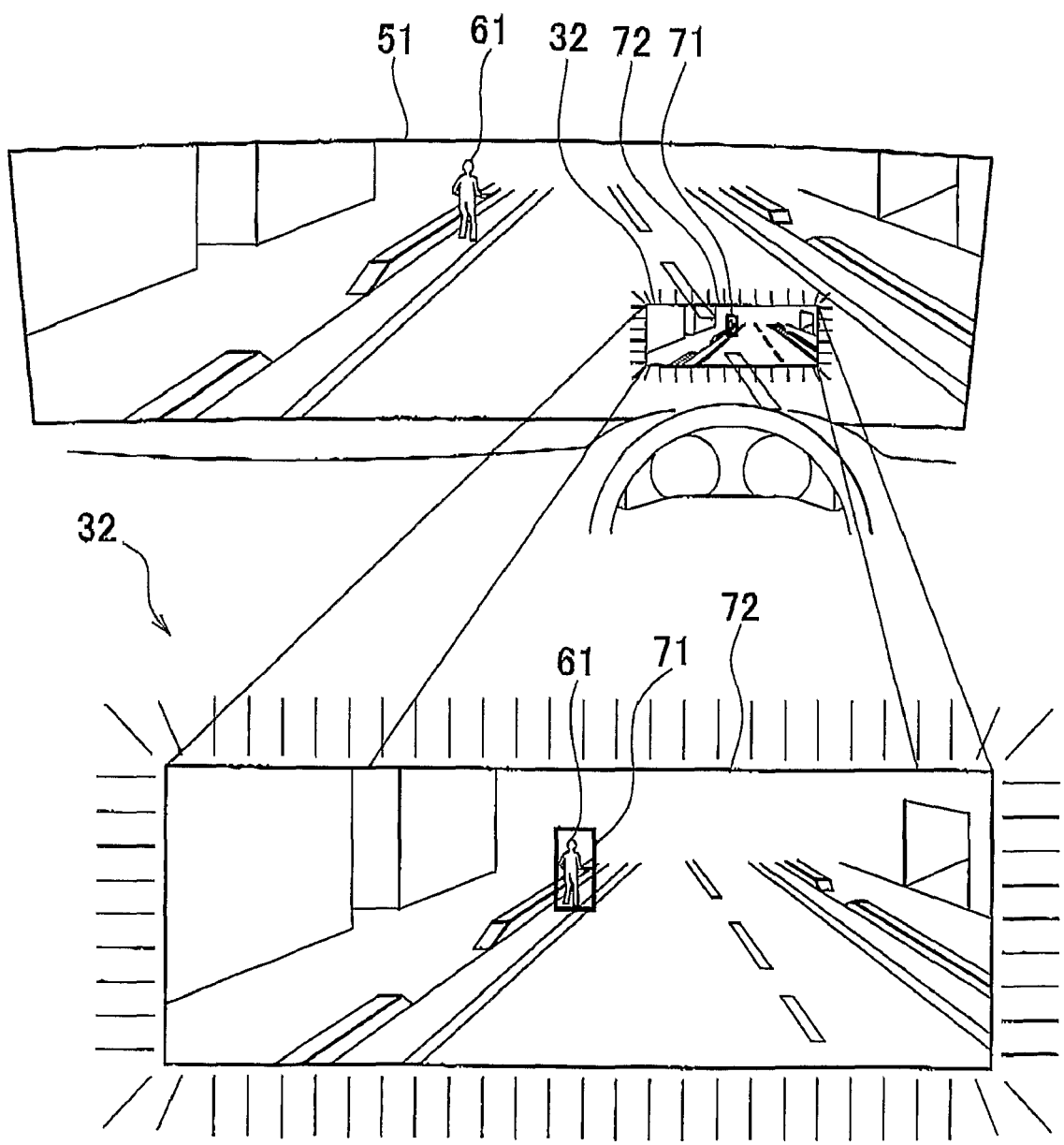
FIG. 8 is a view showing an HUD frame in a head-up display that is shown when the object in FIG. 6 really exists.

Hereinafter, the operation of the vehicle surroundings information display system according to the first example embodiment will be described based on the flowchart shown in FIG. 3 with reference to the time charts shown in FIGS. 4 and 5 and the actual landscape and the image of the displaying means 30 shown in FIGS. 6 to 8. The time chart shown in FIG. 4 is an example of a case in which an object actually exists, and the time chart shown in FIG. 5 is an example of a case in which an object is falsely detected, for example.

In the vehicle surroundings information display system according to the first example embodiment, an image signal from the imaging means 10 is transmitted to the controlling means 20 and the displaying means 30. Every time the controlling means 20 receives the image signal, an image relating to that image signal is displayed on the combiner 32 of the displaying means 30.

First, the controlling means 20 in the first example embodiment receives an image signal from the imaging means 10 (step ST1). Then the object detecting means 21 determines whether there is an object about which the driver should be warned based on that image signal (step ST2).

Figure 5:
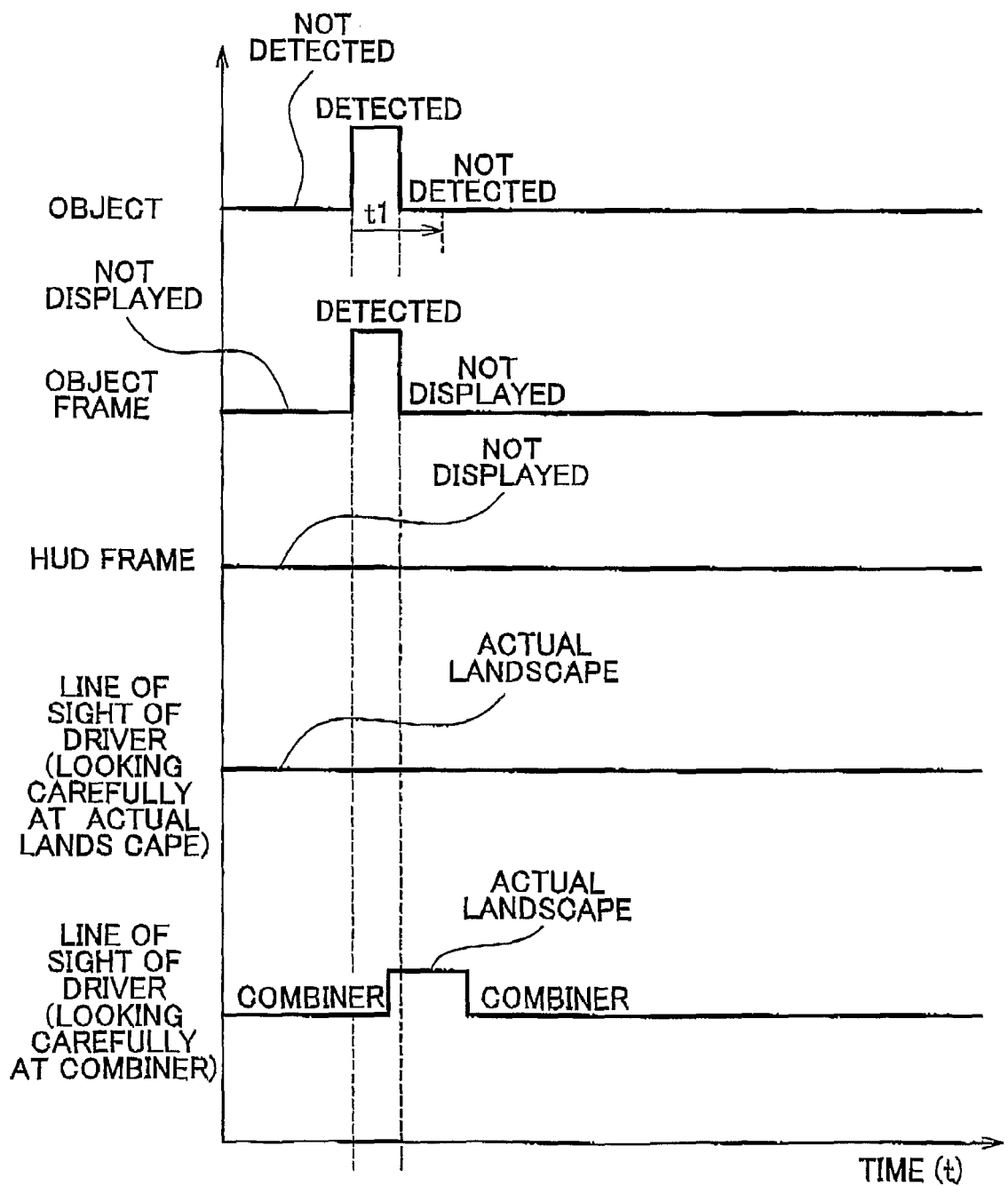
FIG. 5 is a time chart illustrating the relationship between movement of the line of sight of the driver and the steps in the routine of the vehicle surroundings information display system according to the first example embodiment in a case in which an object has been falsely detected.
Figure 6:
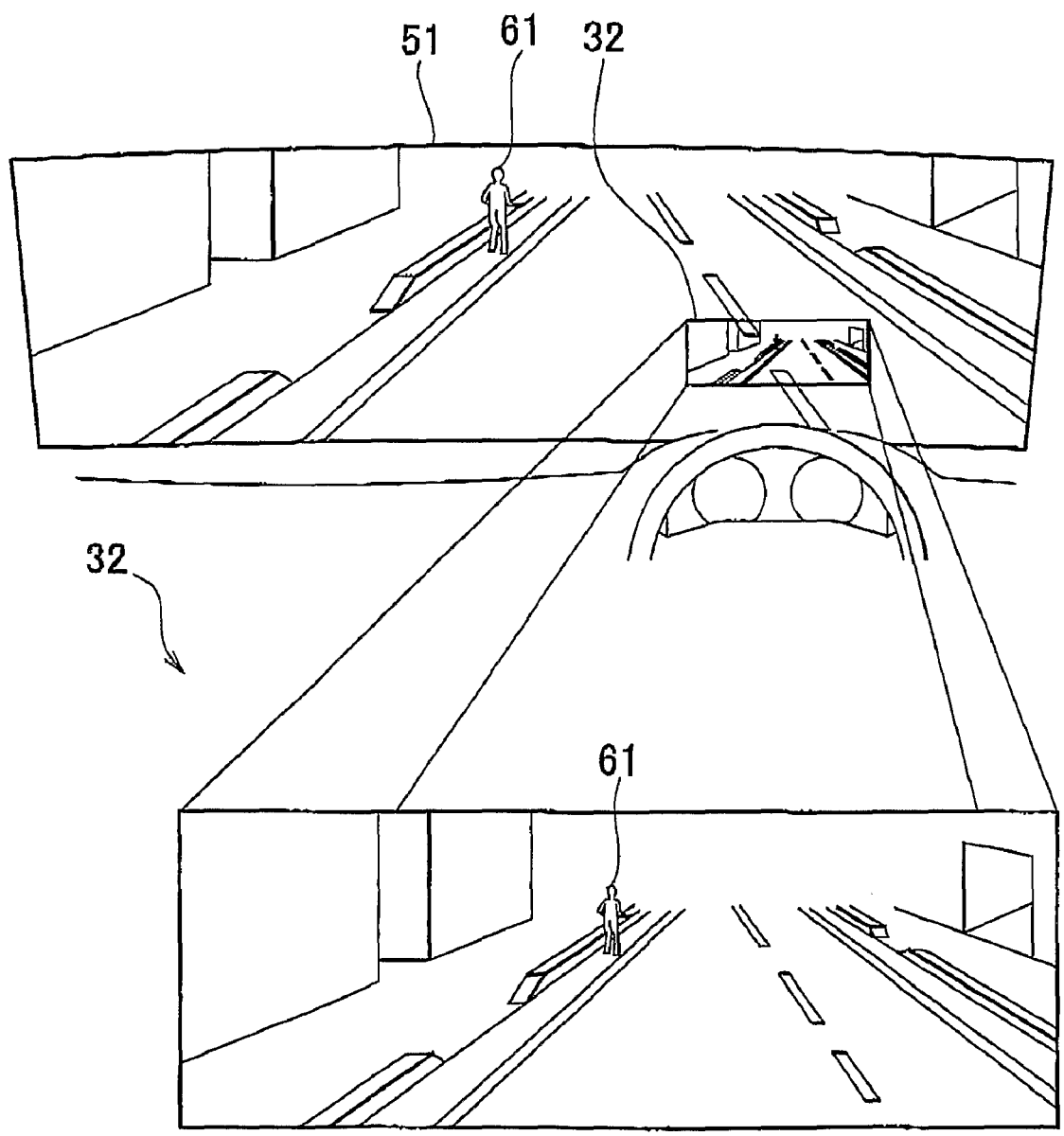
FIG. 6 is a view of one example of an actual landscape that can be seen through a front windshield and a head-up display image displayed on the front windshield with the vehicle surroundings information display system according to the first example embodiment.

Here, the image relating to the image signal is like that shown in FIG. 6. If the object detecting means 21 determines that there is an object (such as a person) 61, then the controlling means 20 generates a signal for displaying an object frame 71 of a low luminance, that surrounds the object 61 using the notifying information generating means 23, as shown in FIGS. 4 and 5. Then the display processing means 24 displays that object frame 71 on the combiner 32 of the displaying means 30, as shown in FIG. 7 (step ST3).

If at this time the driver is looking carefully at the actual landscape in front of him, he may not readily notice the object frame 71, as illustrated in FIGS. 4 and 5. If, on the other hand, the driver is looking carefully at the image on the combiner 32, he will easily notice that object frame 71. Therefore, a driver who wants to drive giving priority to information obtained from the actual landscape can continue to drive as intended without being distracted by the image of the combiner 32. Also, a driver who wants to drive giving priority to information obtained from the image of the combiner 32 can be made aware of the existence of the object 61 instantaneously by the object frame 71. For example, a driver can drive while paying attention to information from the actual landscape as well as the object 61.

Here, the object frame 71 continues to be displayed until the object 61 is no longer detected in step ST2, as shown in FIGS. 4 and 5.

Next, the controlling means 20 uses the detection reliability determining means 22 to determine the detection reliability of the object 61 detected in step ST2 (step ST4). In the first example embodiment, the detection reliability is determined by determining whether the object 61 has continued to be detected for a predetermined period of time t1 (e.g., t1=200 ms) or longer.

Here, if the detection reliability determining means 22 determines that the same object 61 has not continued to be detected for the predetermined period of time t1 or longer in step ST4, then the predetermined period of time t1 has not passed since the object 61 was first detected in step ST2 so it is determined that the detection reliability of the object 61 is low. Therefore, the controlling means 20 returns to step ST1 and repeats the same process for a new image signal.

If, on the other hand, it is determined in step ST4 that the same object 61 has continued to be detected for the predetermined period of time to or longer, the detection reliability determination means 22 determines that the detection reliability of the object 61 is high. In this case, the controlling means 20 controls the notifying information generating means 23 to generate a signal to display the HUD frame 72, as shown in FIG. 4, and then controls the display processing means 24 to make that HUD frame 72 blink on the combiner 32 of the displaying means 30, as shown in FIG. 8 (step ST5).

At this time, the driver starts to pay attention to the image on the combiner 32 because the HUD frame 72 is blinking, regardless of whether he was looking carefully at the actual landscape in front of him or at the image on the combiner 32, as shown in FIG. 4. Therefore, a driver that is giving priority to information obtained from the image of the combiner 32 will of course notice the object frame 71. Further, a driver that is giving priority to information obtained from the actual landscape will also notice the object frame 71 displayed on the combiner 32 by the blinking of the HUD frame 72. In this way, the driver can be made aware of the existence of the object 61 that is surrounded by this object frame 71. Therefore, the driver can drive with caution with respect to the object 61.

The blinking interval of the HUD frame 72 may be set to the optimum value based on testing or the like to catch the eye of a driver that is looking closely at the actual landscape in front of him. For example, in the first example embodiment, that blinking interval is set to 2.5 Hz.

Here, the HUD frame 72 may continue to blink until the object 61 is no longer detected. However, if the blinking is able to draw the line of sight of the driver to the image of the combiner 32 even once, there is no real advantage in continuing the blinking, as any more blinking would just be annoy the driver. On the other hand, regardless of whether the same object 61 continues to be detected, not displaying the HUD frame 72 immediately simply because, it would be annoying is also undesirable because the original object of the vehicle surroundings information display system is to alert the driver to the existence of an object.

Therefore, the controlling means 20 in this example embodiment controls the display processing means 24 to determine whether a predetermined period of time t2 (e.g., t2=500 ms) has passed since the HUD frame 72 started to blink in stop ST5 (step ST6). Until that predetermined period of time t2 passes, the process returns to step ST1 and the same steps are repeated while the display processing means 24 continues to make the HUD frame 72 blink.

If, on the other hand, the predetermined period of time t2 has passed, the controlling means 20 controls the notifying information generating means 23 to continue generating the HUD frame 72, as shown in FIG. 4, and controls the display processing means 24 to illuminate, the HUD frame 72 (step ST7). Accordingly, the visual allure of the HUD frame, 72 is reduced, thus making it less annoying to the driver, while still making the driver aware of the existence and position of the object 61 by the illuminated HUD frame 72 and the object frame 71 if necessary.

The HUD frame 72 may continue to be illuminated until the corresponding object 61 is no longer detected. Alternatively, the HUD frame may continue to be illuminated fox only a predetermined period of time (such as 1000 ms) that is set beforehand.

If it is determined in step ST2 that there is no object, the controlling means 20 controls the notifying information generating means 23 to stop generating all notifying information (i.e., the object frame 71 and the HUD frame 72) related to the object 61, and displays only the image from the imaging means 10 on the combiner 32 (step ST8).

More specifically, when, for example, the vehicle pulls up beside the object 61 while the object frame 71 and the HUD frame 72 are illuminated on the combiner 32, the image signal of the imaging means 10 will no longer include the signal relating to the object 61. As a result, the object detecting means 21 determines in step ST2 that there is no object. Therefore, at this time, the notifying information generating means 23 stops generating the object frame 71 and the HUD frame 72 relating to the object 61 and the display processing means 24 stops displaying the object frame 71 and the like relating to the object 61, as shown in FIG. 4.

At that time, it is conceivable that another object may be detected after that object 61 was detected. At that time, an object frame relating to the other object is displayed. Further, an HUD frame relating to that object may be blinking or illuminated depending on the time for which that other object continues to be detected. If the HUD frame relating to the other object is the same as the HUD) frame 72 relating to the object 61 described above, it is undesirable not to display the HUD frame 72 simply because the object 61 that was detected first is no longer detected, as it would mean that the HUD frame relating to the other object would also not be displayed. At this time, therefore, the HUD frame 72 preferably remains displayed until the other object that was detected later is no longer detected. The HUD frame 72 at that time is illuminated or made to blink for the duration of time for which the other object that was detected later continues to be detected regardless of the time for which the object 61 that was detected first continues to be detected.

Also, when, for example, the object 61 relating to the object frame 71 is falsely detected while the object frame 71 is illuminated on the combiner 32, that object 61 may stop being detected, as shown in FIG. 5. At that time, the object detecting means 21 determines in step ST2 that the object does not exist. Therefore at that time the notifying information generating means 23 stops generating the object frame 71 relating to that object 61 and the display processing means 24 does not display that object frame 71, as shown in FIG. 5.

When no object was detected before and thus no notifying information is displayed, the process returns to step ST1 with the control to not display notifying information in step ST8 continuing to be executed.

As described above, with the vehicle surroundings information display system according to the first example embodiment, until it is clear whether the detected object is real, the combiner 32 displays the object frame (i.e., the notifying information) 71 with low luminance which is easily noticed by a driver who is driving while giving priority to information obtained from the image on the combiner 32, and which is not easily noticed by a driver who is driving while giving priority to information of the actual landscape obtained by his own eyes over that image. When it is clear that the object actually exists, the HUD frame (i.e., the notifying information) 72 is made to blink so as to be easily recognizable by any driver.

As a result, a driver who is driving while looking closely at the actual landscape will not easily notice the existence of the object until the realness of the object is clear. Therefore, that driver is first made aware of the existence of the object after it is clear that the object really exists. On the other hand, a driver who is driving while looking closely at the image on the combiner 32 is able to know of the existence of the object from the point of initial detection. Therefore, the vehicle surroundings information display system according to this first example embodiment can provide information relating to an object that takes the intentions of the driver into account, which improves safety while driving and also eliminates a needless annoyance to the driver.

Also with the vehicle surroundings information display system according to the first example embodiment, the realness of a detected object is determined by determining the detection reliability of the detected object. Therefore, even if the imaging means 10 such as an infrared camera or the like which has low resolution compared with a visible light camera is used, for example, as described above, the driver can correctly alerted to the existence of the object after it is clear that the object really exists. Therefore, inexpensive imaging means 10 such as an infrared camera alone is sufficient without using expensive imaging means such as a visible camera. As a result, the vehicle surroundings information display system can be constructed cheaply. As described above, it does not take much time until it becomes clear whether the object is real or not so even when suddenly avoiding a person jumping out into the road on which the host vehicle is traveling, for example, the driver can be made aware of the existence of the object in the same amount of time as he would be if expensive imaging means were used. The invention does not necessarily exclude the use of this kind of expensive capturing means, however.

Next, a vehicle surroundings information display system according to a second example embodiment of the invention will be described.

The vehicle surroundings information display system according to this second example embodiment differs from the vehicle surroundings information display system according to the first example embodiment shown in FIGS. 1 and 2 described above in that the detection reliability determining method of the detection reliability determining means 22 in the controlling means 30 is modified as follows.

The detection reliability determining means 22 according to the first example embodiment determines whether the same object has continued to be detected for a predetermined period of time to or longer. The detection reliability is then determined to be either high or low depending on the result. Here, continuing to detect the same object for the predetermined period of time t1 or longer is the same as the controlling means 20 continuously receiving image signals from the imaging means 10 during that time and detecting continuously the same object from all of those image signals a plurality of times. Therefore, when determining the detection reliability, that detection reliability can be determined to be high or low based on the number of continual detections of the same object.

Therefore, in this second example embodiment, the detection reliability determining means 22 is structured to determine whether the detection reliability is high or low based on the determination of whether the same object was continuously detected a predetermined number of times n or more. More specifically, the detection reliability determining means 22 according to the second example embodiment determines that the detection reliability is high when the same object is continuously detected for the predetermined number of times n or more, and determines that the detection reliability is low when the same object is not continuously detected for the predetermined number of times n or more.

Figure 3:
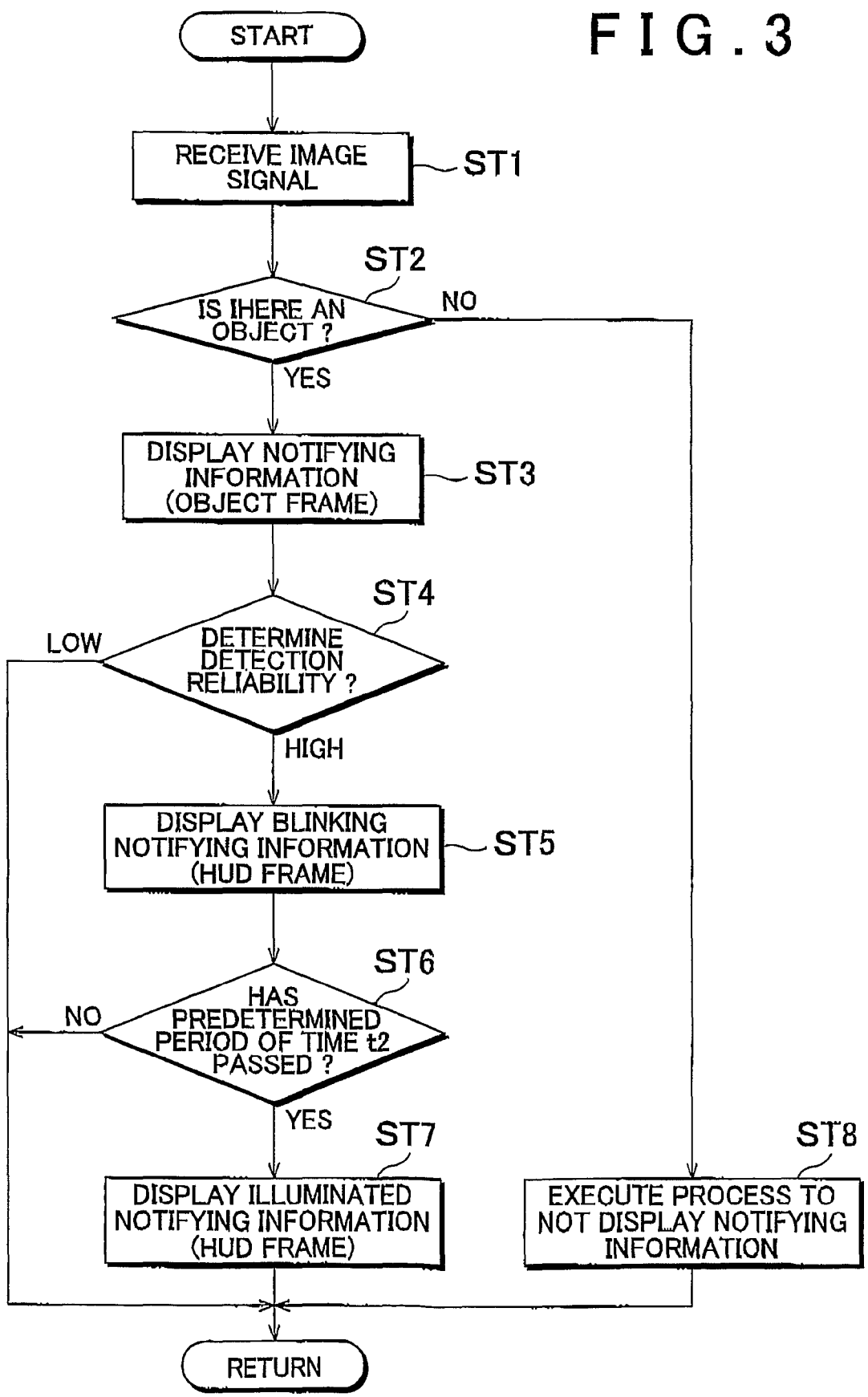
FIG. 3 is a flowchart illustrating steps in a routine of the vehicle surroundings information display system according to the first example embodiment.
Figure 4:
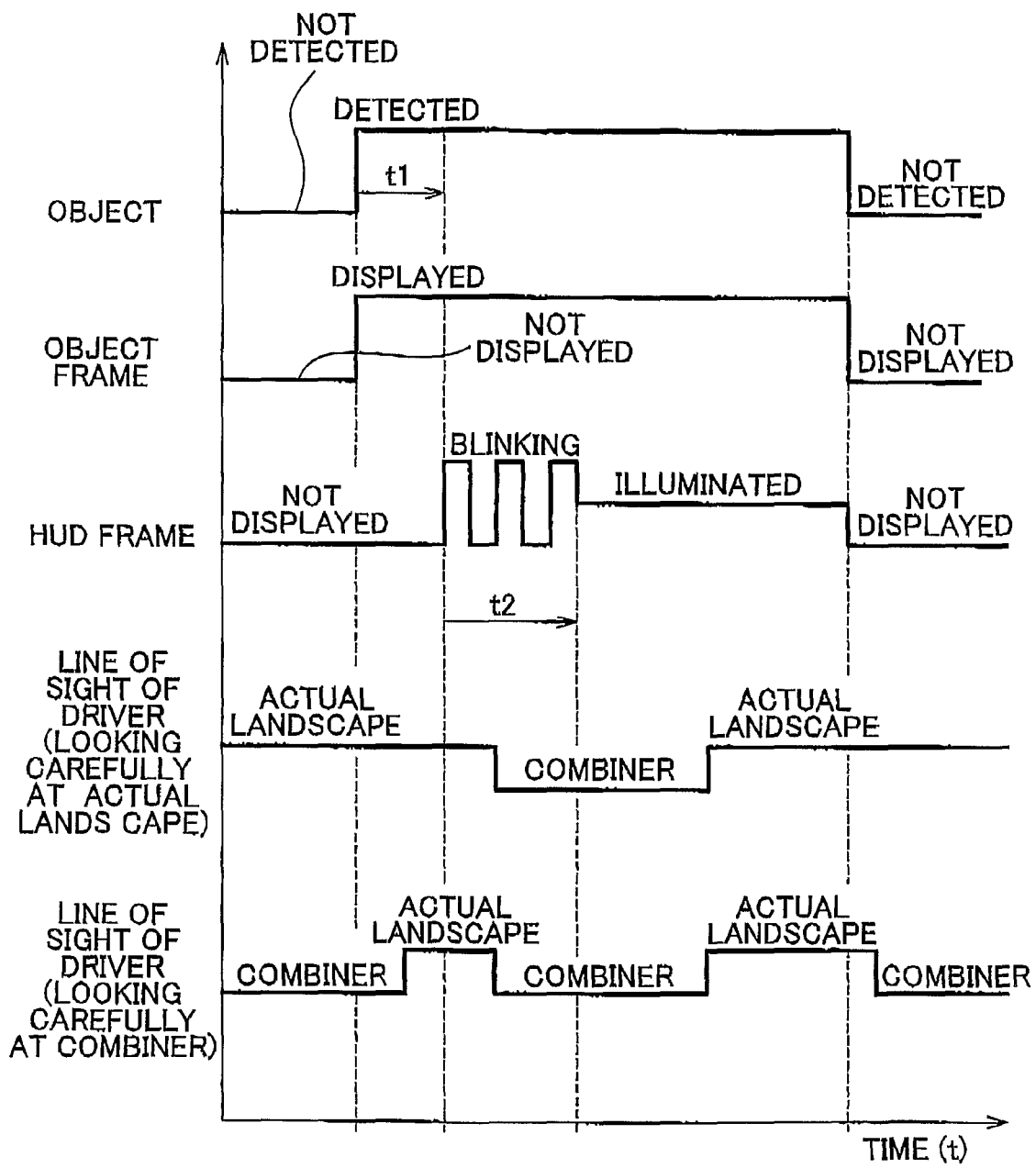
FIG. 4 is a time chart illustrating the relationship between movement of the line of sight of the driver and the steps in the routine of the vehicle surroundings information display system according to the first example embodiment in a case in which an object really exists.

The vehicle surroundings information display system according to this second example embodiment provided with this kind of detection reliability determining means 22 basically operates as illustrated in the flowchart shown in FIG. 3 and the time charts shown in FIGS. 4 and 5 of the first example embodiment described above. As shown FIGS. 6 to 8 exemplified in the first example embodiment, when the actual landscape changes, the object frame 71 and the like is displayed as shown in the image of the combiner 32 in each drawing. Therefore, only the operation unique to the second example embodiment will be described here; detailed descriptions of the other operations will be omitted.

In the vehicle surroundings information display system according to the second example embodiment, the same object 61 as in the first example embodiment is detected by the object detecting means 21 by steps ST1 and ST2. When the notifying information generating means 23 and the display processing means 24 display the low luminance object frame 71 related to the object 61 on the combiner 32 in step ST3, the detection reliability determining means 22 according to the second example embodiment then determines the detection reliability of that object 61 in step ST4.

More specifically, the detection reliability determining means 22 in this second example embodiment determines that the detection reliability is high when the object 61 has continued to be detected for a predetermined number of times n (e.g., n=6) or more. On the other hand, the detection reliability determining means 22 determines that the detection reliability is low when the object 61 has not continued to be detected for the predetermined number of times n or more.

Here, when the object 61 is not continually detected for the predetermined number of times n or more in step ST4, the controlling means 20 returns to step ST1 and repeats the same process for a new image signal.

If, on the other hand, the object 61 continues to be detected for the predetermined number of times n or more, the controlling means 20 controls the notifying information generating means 23 and the display processing means 24 to make the HUD frame 72 blink on the combiner 32 in step ST5.

Thereafter, the controlling means 20 executes the same steps as in the first example embodiment.

In the foregoing vehicle surroundings information display system according to the second example embodiment as well, until it is clear whether the detected object is real, the combiner 32 displays the object frame (i.e., the notifying information) 71 with tow luminance which is easily noticed by a driver who is driving while giving priority to information obtained from the image on the combiner 32, and which is not easily noticed by a driver who is driving while giving priority to information of the actual landscape obtained by his own eyes over the information from that image. When it is clear that the object actually exists, the HUD frame (i.e., the notifying information) 72 is made to blink so as to be easily recognizable by any driver. Therefore, the vehicle surroundings information display system according to this second example embodiment can also provide information relating to an object that takes the intentions of the driver into account, similar to the first example embodiment, which improves safety while driving and also eliminates a needless annoyance to the driver.

Also, although the determination method is different, it determines the realness of the detected object by determining the detection reliability of that object, just as in the first example embodiment, so expensive imaging means such as a visible light camera does not have to be used. As a result, the vehicle surroundings information display system can be constructed cheaply.

The notifying information in the first and second example embodiments described above is not limited to being aimed at the visual sense (i.e., visual information) as described in those examples, but may be anything that stimulates any of the five senses. For example, instead of or in addition to the HUD frame (notifying information) 72 that blinks on the combiner 32 described above, a warning sound or the like serving as the notifying information way be emitted which stimulates the auditory sense.

Also, the detection reliability determining means 22 in the first and second example embodiments described above determines the detection reliability according to two levels, i.e., high and low. The detection reliability may also be determined divided into more levels than just these two. In this case, the notifying information generating means 23 may change the luminance of the object frame (i.e., notifying information) 71 in steps depending on the detection reliability, for example. Further, the notifying information generating means 23 may also change the luminance or blinking interval of the HUD) frame (i.e., notifying information) 72 in steps depending on the detection reliability.

Also, the imaging means 10 described in the first and second example embodiments above captures an image of an area in front of the vehicle, but it may also capture an image of an area in back of the vehicle, for example. In this case, the imaging mean 10 can be applied to a vehicle surroundings information display system like a so-called back guide monitor.

Also, the imaging means 10 was given as an example of the vehicle surroundings information obtaining means 10 in the first and second example embodiments described above, but a radar system or the like may be used instead of that imaging means 10.

Further, a head-up display system was given as an example of the displaying means 30 in the first and second example embodiments described above, but the invention is not necessarily limited to this. For example, in recent years car navigation systems have come to be mounted in many vehicles. Since these systems include a monitor, that monitor may also be used as the displaying means 30.

As described above, the vehicle surroundings information display system according to the invention is useful as technology that provides information about the vehicle surroundings while taking the intentions of the driver into account.

While the invention has been described with reference to exemplary embodiments thereof, it is to be understood that the invention is not limited to the exemplary embodiments or constructions. To the contrary, the invention is intended to cover various modifications and equivalent arrangements. In addition, while the various elements of the exemplary embodiments are shown in various combinations and configurations, which are exemplary, other combinations and configurations, including more, less or only a single element, are also within the spirit and scope of the invention.

The invention claimed is:

1. A vehicle surroundings information output system comprising:
a vehicle surroundings information obtaining device that obtains information about the vehicle surroundings;
an object detecting device that detects an object around the vehicle based on the vehicle surroundings information obtained from the vehicle surroundings information obtaining device,
an output device that outputs information relating to the object detected by the object detecting device;
a detection reliability determining device that determines a detection reliability of the object detected by the object detecting device; and
a notifying information generating device that generates first visual notifying information viewable by a driver when the detection reliability of the object is at a first level and that generates second visual notifying information when the detection reliability is at a second level higher than the first level,
wherein the notifying information generating device generates notifying information which changes a luminance of the object displayed by the output device according to the level of the detection reliability of the object.

2. The vehicle surroundings information output system according to claim 1, wherein the detection reliability determining device determines the detection reliability based on a time for which the object continues to be detected or a number of times that the object continues to be detected.

3. The vehicle surroundings information output system according to claim 1, wherein at least one of the first or second visual notifying information is displayed blinking by the output device according to a level of the detection reliability of the object.

4. The vehicle surroundings information output system according to claim 1, wherein the notifying information generating device continues to generate at least one of the first or second visual notifying information until the object is no longer detected.

5. The vehicle surroundings information output system according to claim 1, wherein the notifying information generating device continues to generate at least one of the first or second visual notifying information for a predetermined period of time.

6. A vehicle surroundings information output system comprising:
   a vehicle surroundings information obtaining device that obtains information about the vehicle surroundings;
   an object detecting device that detects an object around the vehicle based on the vehicle surroundings information obtained from the vehicle surroundings information obtaining device,
   an output device that outputs information relating to the object detected by the object detecting device;
   a detection reliability determining device that determines a detection reliability of the object detected by the object detecting device; and
   a notifying information generating device that generates visual notifying information that increasingly visually stimulates a driver the higher the detection reliability determined by the detection reliability determining device,
   wherein the notifying information generating device generates notifying information which changes a luminance of the object displayed by the output device according to the level of the detection reliability of the object.

7. A method for outputting vehicle surroundings information, comprising:
   obtaining information about the vehicle surroundings;
   detecting information relating to an object around the vehicle based on the obtained vehicle surroundings information;
   outputting the detected information relating to the object;
   determining a reliability of the detected information relating to the object; and
   generating first visual notifying information for viewing by a driver when that reliability is at a first level and that generates second visual notifying information when that reliability is at a second level higher than the first level,
   wherein the second visual notifying information is displayed with a higher luminescence than the luminescence with which the first visual notifying information is displayed.

8. A method for outputting vehicle surroundings information, comprising:
   obtaining information about the vehicle surroundings;
   detecting information relating to an object around the vehicle based on an obtained vehicle surroundings information;
   outputting the detected information relating to the object;
   determining a reliability of the detected information relating to detected object; and
   generating visual notifying information for viewing by a driver more strongly, as the reliability increases, by changing a luminance of the object displayed by the output device according to the level of the detection reliability of the object.

9. The vehicle surroundings information output system according to claim 1, wherein the output device generates a heads up display simulating a landscape in front of the vehicle as viewed from inside the vehicle.

10. The vehicle surroundings information output system according to claim 9, wherein the heads up display is a miniature view of the landscape in front of the vehicle.

11. The vehicle surroundings information output system according to claim 3, wherein the output device stops the blinking of the at least one of the first or second visual notifying information after a predetermined period of time, regardless of whether the object continues to be detected.

* * * * *